F. W. SMITH, Jr.
DUST COLLECTOR FOR VACUUM CLEANERS.
APPLICATION FILED APR. 21, 1910.
971,013.
Patented Sept. 20, 1910.
2 SHEETS—SHEET 1.
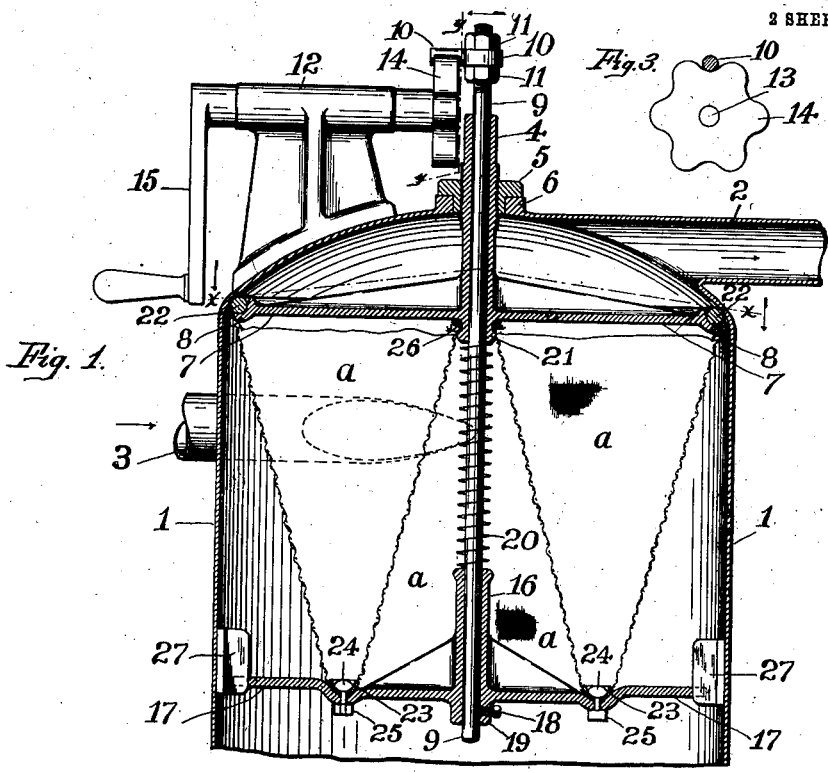
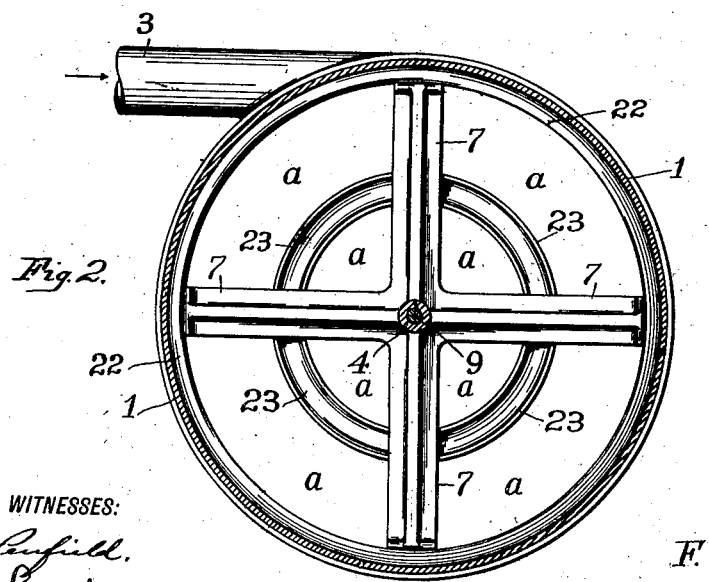
WITNESSES:
INVENTOR
F. W. Smith Jr.
BY
ATTORNEY F. W. SMITH, Jr.
DUST COLLECTOR FOR VACUUM CLEANERS.
APPLICATION FILED APR. 21, 1910.
971,013.
Patented Sept. 20, 1910.
2 SHEETS—SHEET 2.
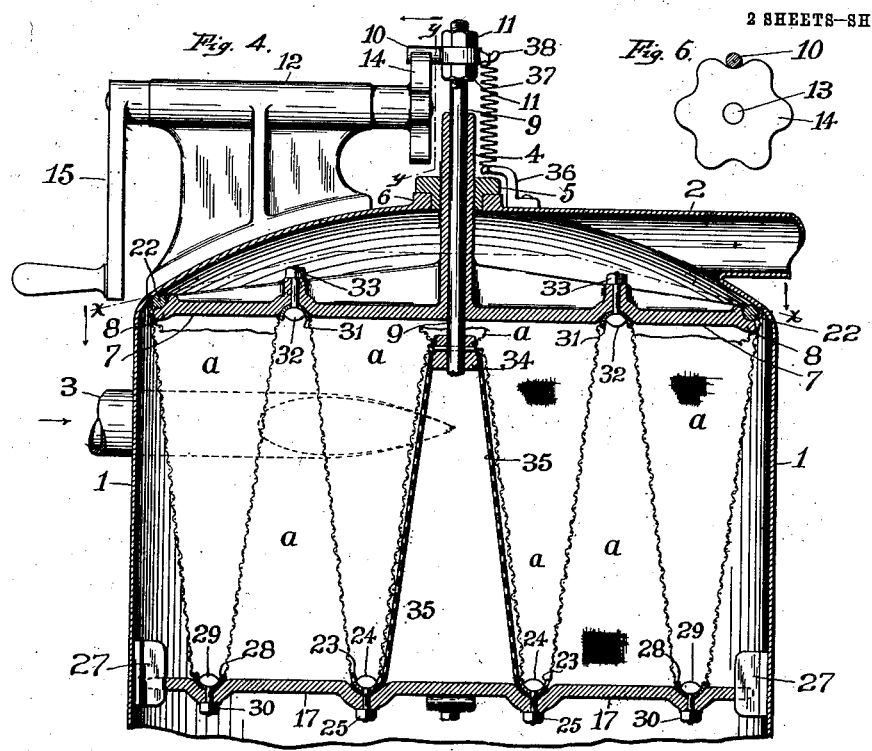
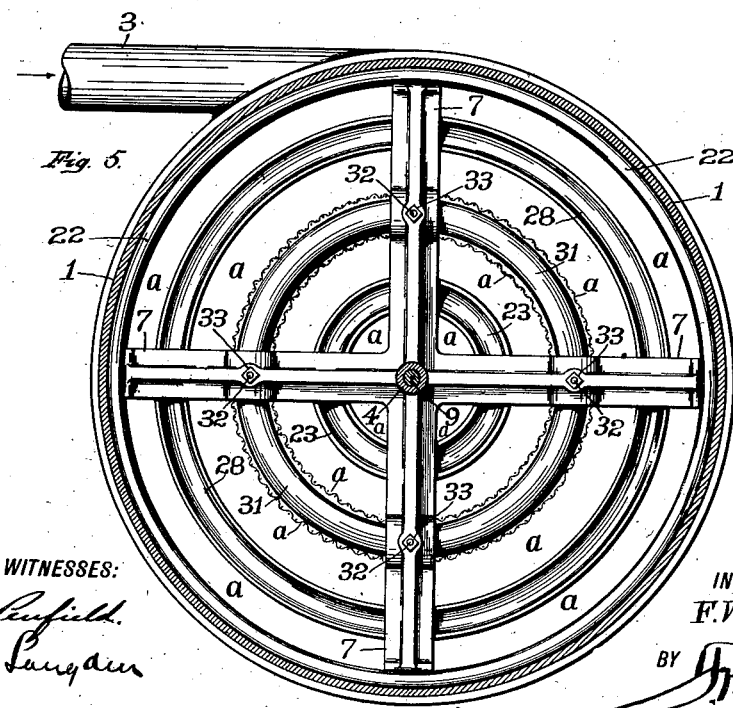
WITNESSES:
INVENTOR
F. W. Smith Jr.
BY
ATTORNEY

UNITED STATES PATENT OFFICE.

FRIEND W. SMITH, JR., OF BRIDGEPORT, CONNECTICUT, ASSIGNOR TO CLARENCE C. PAYNE, OF BRIDGEPORT, CONNECTICUT.

DUST-COLLECTOR FOR VACUUM-CLEANERS.

971,013.

Specification of Letters Patent. Patented Sept. 20, 1910.

Application filed April 21, 1910. Serial No. 556,765.

*To all whom it may concern:*

Be it known that I, FRIEND W. SMITH, Jr., a citizen of the United States, residing in the city of Bridgeport, county of Fairfield, and State of Connecticut, have invented certain new and useful Improvements in Dust-Collectors for Vacuum-Cleaners; and I do declare the following to be a full, clear, and exact description of the invention, such as will enable others skilled in the art to which it appertains to make and use the same.

My invention relates to certain new and useful improvements in dust collectors for vacuum cleaners, and has for its object to provide an apparatus of this description which shall possess an extensive screening area through which the dust laden air is purified, and also to provide means whereby the dust screening elements may be cleansed of particles of dust or other foreign matter adhering thereto, a further object of my invention being to provide an exceedingly simple and efficient construction readily assembled and not at all likely to get out of order.

With these ends in view my invention consists in the construction and arrangement of parts hereinafter fully described and then particularly pointed out in the claims which conclude this description.

In the accompanying drawing Figure 1 is a broken sectional elevation illustrating my improvement—Fig. 2 a section at the line *x*, *x*, of Fig. 1—Fig. 3 a section at the line *y*, *y*, of Fig. 1—Fig. 4 a broken sectional elevation illustrating a modification of my improvement—Fig. 5 a section at the line *x*, *x*, of Fig. 4, and Fig. 6 a section at the line *y*, *y*, of Fig. 4.

Similar numerals of reference denote like parts in the several figures of the drawing.

My improvement relates mainly to the construction and arrangement of the dust screening elements whereby they may be kept clean by a shaking process and without the use of any scrapers or other means operating directly against the fabric through which the dust laden air is purified, all of which will be readily understood from the following description:—

Referring to Figs. 1, 2, and 3, 1 is the dust chamber of any suitable shape and construction, 2 an outlet pipe leading from the top of said chamber and connecting with any suitable pump, and 3 an inlet pipe through which the dust laden air is introduced within said chamber, said pipe 3 being connected in any suitable and ordinary manner with the usual suction nozzle employed in vacuum cleaners. My present improvement has nothing whatever to do with any particular pump or suction nozzle, and therefore I have not illustrated such pump and nozzle since the construction and arrangement of the same is very ordinary and well understood. 4 is a threaded sleeve extending upwardly through the top of the chamber and engaged by a shouldered nut 5 which latter rests upon a hub 6 preferably integral with the top of said chamber, so that it will be clear that when said nut is manipulated said sleeve will be elevated or lowered according to the direction in which the nut is turned. Rigid with this sleeve 4 is a spider 7, the outer extremities of whose arms are provided with concaved recesses or seats 8. 9 is an agitator rod extending loosely through said sleeve and provided at the upper end with a laterally extending lug 10. In the present instance the top of this rod is threaded and the body of this lug 10 surrounds this threaded portion and is flanked above and below by nuts 11 so that by the manipulation of these nuts the normal elevation of said lug may be adjusted. 12 is a horizontal bearing secured to the top of the chamber 1 and through which extends a short shaft 13 on the inner end of which latter is rigidly secured an agitator wheel 14 while on the outer extremity of said shaft a crank 15 is secured. The relative arrangement of the lug 10 and wheel 14 are such that said lug rests at all times against the wheel, and the latter is constructed with elevations and depressions so that when it is revolved the rod 9 will be reciprocated vertically, or, in other words, in the direction of its length. This rod 9 extends downwardly within the chamber 1 and passes freely through a sleeve 16 the lower end of which is rigid with a spider 17, the lower extremity of said rod being secured to said spider in any ordinary manner as by a bolt 18 driven through a hub 19 on the spider directly against said rod. 20 is a coil spring which surrounds the rod and is confined between the upper extremity of the sleeve 16 and a nub 21 which surrounds said rod and depends from the spider 7. I employ any suitable cloth fabric to act as a strainer for purifying the air, and this fabric is disposed within the chamber 1 and between the spiders 7, 17, in convolutions which latter are circular in cross section and concentric with each other and also with the rod 9, and primarily this fabric is in the shape of an elongated cone. The large end of this cone shaped fabric a is secured over a ring 22 which latter is held within the seats 8 at the extremities of the arms of the spider 7, the fabric being then led downwardly at an angle and passed around a semi-circular shaped annulus 23 which latter is secured to the spider 17 by means of bolts 24 and nuts 25; the fabric is then led upwardly at an angle and secured at its smaller end to the nub 21 by means of a clamping ring 26 or in any other ordinary manner. The nut 5 is adjusted to elevate the spider 7 and thereby bring the ring 22 in dust proof contact with the upper wall of the chamber 1, and the lower spider 17 is always forced downwardly by the tension of the spring 20, thus keeping the fabric a taut at all times which is a very desirable feature since such fabric is thereby enabled to better serve as a means for straining or purifying the air. When it is desired to clean the fabric, the crank 15 is revolved thereby rapidly reciprocating the rod 9 and the spider 17 and causing the fabric a to alternately relax and tauten with a snappy action which latter is due to the weight of the rod and the spider 17 carried thereby and is accentuated by the recovery of the spring 20 which latter violently throws the lug 10 from the high points of the wheel 14 into the depressed portions thereof. In order to prevent any swaying of the fabric convolutions and the spider 17 the latter may engage with guide lugs 27 secured to the inner circumference of the chamber 1 but I do not consider that such lugs are necessary although they may be employed merely as a matter of precaution. In the event that a greater number of convolutions of the fabric a is desired, or that a centrally disposed support for the fabric is deemed necessary without any direct connection between the rod 9 and the lower spider, this may be provided for by constructing the parts shown at Figs. 4 and 5 which I will now explain. Right here I desire to say that the number of convolutions of the fabric is immaterial, so long as they are all circular in cross section and are concentric with each other and with the axis of the rod 9.

Referring to Figs. 4 and 5, it will be noted that I have provided an additional exterior convolution of the fabric which latter is secured to the ring 22 in the manner hereinbefore explained, thence led downwardly around an annulus 28 secured to the spider 17 by bolts 29 and nuts 30, then led upwardly around a smaller annulus 31 secured to the upper spider 7 by means of bolts 32 and nuts 33, and from this point led downwardly around the annulus 23 hereinbefore referred to, the fabric being then led upwardly and secured in any suitable manner around a block 34 carried by the rod 9 which latter in this instance is shortened so as to end at or about the apex of the central convolution of the fabric. Within this central convolution of the fabric is a foraminated metal cone 35 which extends close to the fabric and is secured at its upper end to the block 34, while the lower edge of this cone passes beneath the annulus 23 and is secured to the spider 17 by means of the same bolts 24 and nuts 25 that secure the fabric. Instead of having the spring element around the rod 9, one or more small brackets 36 (only one shown) may be secured to the top of the chamber and a coil spring 37 secured as to its extremities to this bracket and to a hook 38 projecting from the lug 10, the function of this spring being to always bring said lug into violent contact with the depressed portions of the agitator wheel 14. The cone 35 really acts as an extension to the rod 9, since it is rigid therewith as to vertical reciprocation. Also, the inner extremity of the cloth fabric a may be secured directly around a part carried by the rod 9, the latter being shortened as shown at Fig. 4 and the cone entirely dispensed with, in which instance the lower spider 17 would be suspended solely by the fabric itself, and the vertical reciprocations of the rod 9 would then cause the spider 17 to be elevated and dropped with a shock thereby jarring the dirt or other foreign particles from said fabric. I therefore do not wish to be limited to any rigid connection between the rod 9 and the lower spider, since the operation of my improvement and the effects produced are the same whether the lower spider 17 be suspended solely by the fabric or whether there is a rigid connection between such spider and rod.

I do not wish to be understood as making any broad claim to a convoluted fabric strainer whose convolutions are angularly disposed and are circular in cross section and concentric with each other and with the agitator rod, except in connection with my present improvement which latter relates solely to a very simple construction whereby the fabric may be kept clean without the use of any especially provided instrumentalities. Also it is not absolutely necessary to employ a spring element for the purpose of accentuating the downward reciprocating movements of this rod, since the weight of the parts suspended from the rod is sufficient to bring about this result to a certain degree but I prefer to employ a spring element since it insures a quicker downward reciprocation of said rod, and when the fabric is lifted bodily by the upward reciprocations of the rod it is then dropped more abruptly so as to violently jar the fabric.

Having thus described my invention what I claim as new and desire to secure by Letters Patent is:—

1. In a dust collector for vacuum cleaners, the combination of a dust separating chamber having its top formed with converging walls, an upper and a lower support located in said chamber, a ring secured to the outer edge of the upper support, means for adjusting the position of said upper support to form a dust-proof joint between said ring and the inner face of said converging walls, and a screen interposed between said supports and secured at its upper edge to said ring and at its lower edge to the lower support.

2. In a dust collector for vacuum cleaners, the combination of a dust separating chamber having its top formed with converging walls, an exteriorly threaded sleeve extending upwardly through said converging walls, a support located in said chamber and secured to said sleeve, a ring secured to the outer edge of said support, a support located in said chamber below the first-named support, a screen interposed between said supports and secured at its upper edge to said ring, and at its lower edge to the second-named support, and a nut engaged with said sleeve for raising the same, to form a dust-proof joint between said ring and the inner face of said converging walls.

In testimony whereof I affix my signature in presence of two witnesses.

FRIEND W. SMITH, Jr.

Witnesses:
M. T. LONGDEN,
J. L. EGAN.